Figure 2:
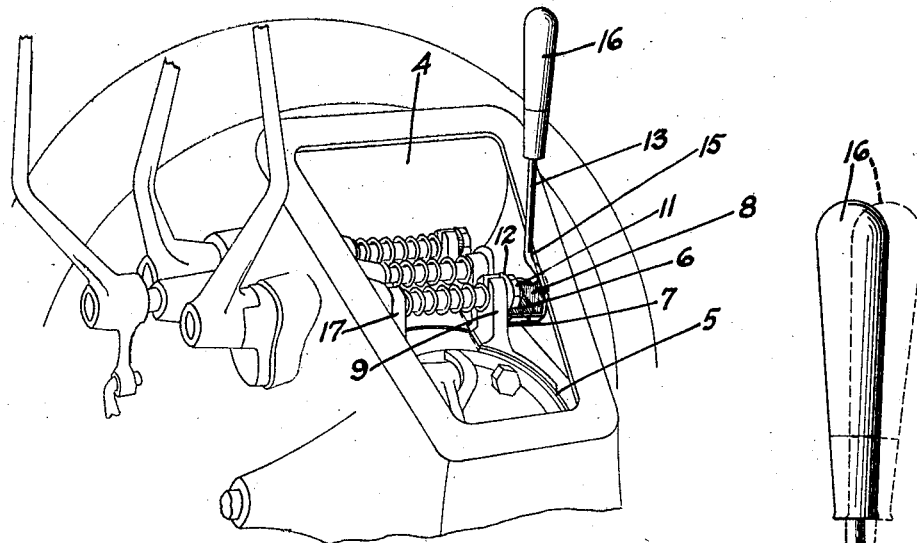

Sept. 13, 1927. 1,641,994

G. T. SCHESVOLD ET AL

TOOL FOR REMOVING TRANSMISSION BANDS

Filed July 31, 1925

Inventors
GEORGE T. SCHESVOLD
ARTHUR M. JOHNSON

ATTORNEYS

Patented Sept. 13, 1927.

1,641,994

UNITED STATES PATENT OFFICE.

GEORGE T. SCHESVOLD AND ARTHUR M. JOHNSON, OF MINNEAPOLIS, MINNESOTA.

TOOL FOR REMOVING TRANSMISSION BANDS.

Application filed July 31, 1925. Serial No. 47,252.

This invention relates to an improved tool for removing transmission bands such, for instance, as are employed in the transmission of the well-known Ford automobile, and more particularly relates to such a tool which may be inserted into the transmission case and is adapted for use to compress the bands so that the usual adjusting nuts may readily be removed from the pedal shafts to permit the removal of the bands from the transmission case, as when the bands become worn and require relining, or when it becomes necessary to install new bands.

An object of the invention is to provide a tool of the class described having a cup-shaped end-portion adapted to be inserted into the transmission case and to engage the lug of the transmission band at a point beneath the adjusting nut for the purpose of compressing the band sufficiently to permit the adjusting nut to be readily removed therefrom, the shank of the tool also being so shaped as to engage the edge of the opening through the transmission case so that when pressure is brought to bear upon the handle thereof, said point of contact will function as a fulcrum upon which the tool will oscillate, thereby forcing the cup-shaped end-portion against the band lug and thus causing the lug to move away from the nut so that it may readily be rotated upon the pedal shaft without the use of a wrench or other tool.

A further object is to provide a tool having a cup-shaped end-portion adapted to receive the adjusting nut and lock washer when removed from the pedal shaft, thereby preventing such parts from accidentally dropping into the bottom of the transmission case.

The particular object of the invention therefore is to provide a tool adapted for use in removing transmission bands from a transmission case having means for receiving the adjusting nut and lock washer to prevent them from accidentally dropping into the transmission case.

Other objects of the invention will appear from the following description and the accompanying drawings and will be pointed out in the annexed claims.

In the drawings, there has been disclosed a structure designed to carry out the various objects of the invention, but it is to be understood that the invention is not confined to the exact features shown as various changes may be made within the scope of the claims which follow.

Figure 3:
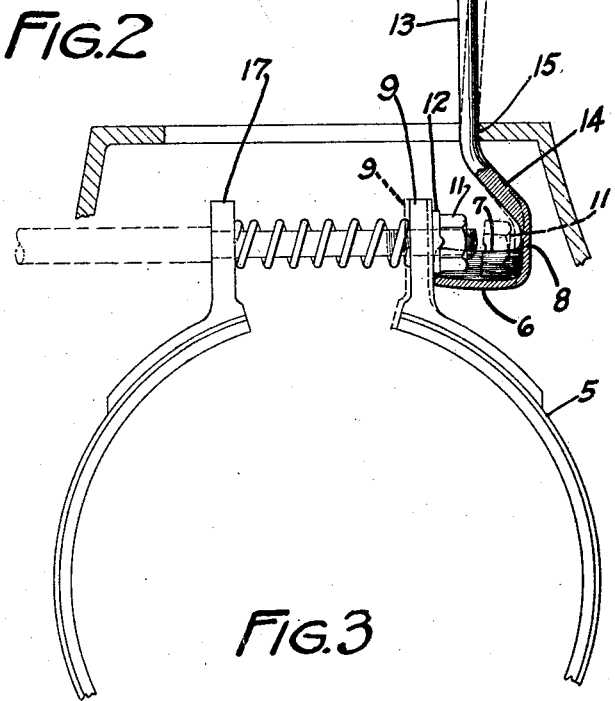
Figure 1:
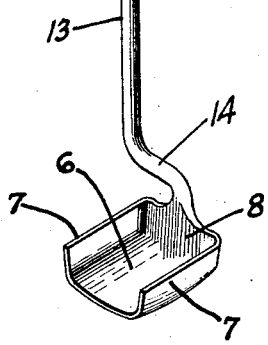

In the accompanying drawings forming part of this specification,

Figure 1 is a perspective view of the improved tool showing the means provided thereon for receiving the adjusting nut and lock washer;

Figure 2 is a perspective view of a portion of the transmission case showing the tool inserted therein; and Figure 3 is an enlarged cross-sectional view showing how the lower end of the tool is adapted to engage the lug of the transmission band beneath the adjusting nut and also how the upper edge of the transmission case may provide a fulcrum upon which the tool may be oscillated to compress the band.

In the selected embodiment of the invention here shown, for purposes of disclosure, there is illustrated a portion of a transmission case such as is employed in the construction of the well-known Ford automobiles. This transmission case is provided with the usual opening 4 in the upper portion thereof through which access may be had to the interior thereof for the purpose of adjusting the transmission bands 5 or for the purpose of removing the bands from the casing, as when it becomes necessary to reline them or instal new bands.

The novel tool featured in this invention preferably has its lower end-portion shaped to provide a cup-like receptacle or member 6 defined by the side walls 7 and the end wall 8. The opposite end of the receptacle is preferably open and is adapted to engage the upright lug 9 of the band at a point beneath the adjusting nut 11 and lock washer 12 of the pedal shaft, as shown in Figures 2 and 3. The shank 13 of the tool is preferably provided with an offset 14 so that when the tool is inserted into the transmission case the relatively straight portion of the shank 13 may engage the edge 15 of the transmission case to provide a fulcrum therefor. Thus, when the tool is in the position shown particularly in Figure 3, and pressure is brought to bear upon the handle 16, the edge of the opening 4 of the transmission case will provide a pivotal point upon which the tool may oscillate, as indicated by the dotted lines in Figure 3. When the tool is moved from the full to the dotted lines position in this figure, the lower open end of the receptacle 6 will engage the upright lug 9 of the band and will force it inwardly or towards the relatively stationary lug 17, thereby removing the pressure against the adjusting nut so that it may be readily rotated upon its shaft without the use of a wrench or other tool.

By the use of this novel tool, the adjusting nuts and lock-washers of the transmission bands may readily be removed from the pedal shaft without the use of a wrench or other tool and without any danger of such parts accidentally dropping into the lower portion of the transmission case. When the adjusting nut is removed from the end of the pedal shaft, it will drop into the cup-shaped end-portion of the tool as indicated by the dotted lines in Figure 3, after which the pedal shaft may be partially withdrawn from the transmission case and the tool removed therefrom carrying with it the adjusting nut and lock washer.

This novel tool may also be used when adjusting the bands to take up wear. When thus used the tool will be inserted into the case as shown in Figures 2 and 3 after which pressure will be brought to bear against the handle 16 to compress the band. After the band has thus been compressed the adjusting nut 11 may readily be rotated upon its shaft to relatively adjust the position of the band.

Having thus described our invention, what we claim as new and desire to secure by United States Letters Patent, is:

1. A tool of the class described, comprising a shank having a receptacle terminally formed thereon the bottom of which is arranged at substantially right angles to the axis of the shank; there being an offset on the shank adjacent said receptacle to permit the insertion of the receptacle into a transmission case and to position it in engagement with a transmission band, and with the shank engaging a portion of the transmission case to provide a fulcrum for the tool, whereby the transmission band may be compressed and its adjusting nut removed therefrom and received in said receptacle.

2. A tool of the class described, comprising a shank having a receptacle terminally formed thereon and open at one end and having its bottom arranged at substantially right angles to the axis of the shank, there being an offset in said shank adjacent said receptacle to permit the insertion of the receptacle into a transmission case with its open end in engagement with a transmission band beneath the adjusting nut and lock washer thereof, the offset in said shank being so shaped that when the receptacle is in engagement with the band, the shank will engage a portion of the transmission case to provide a fulcrum for the tool, whereby the band may be compressed to permit the removal of the adjusting nut therefrom.

3. As a new article of manufacture, a tool comprising a shank having an elongated receptacle thereon having its top and one end open, there being an offset in said shank whereby the receptacle may be inserted into a transmission case with its open end engaging a transmission band, the open end of the receptacle being offset from the axis of the shank whereby, when said end is engaged with the band, and the tool is operated to compress said band, the nut may be removed from its supporting means and will be received in the receptacle for removal from the transmission case.

4. A device of the class described comprising a shank having a portion thereof offset from the axis of the shank and arranged substantially parallel thereto, a receptacle integrally formed with said offset portion and having its bottom arranged at substantially right angles to the axis of the shank, said receptacle having its top and one end open, and the open end of the receptacle being adapted to engage a transmission band as the shank fulcrums on the transmission case.

In witness whereof, we have hereunto set our hands this 28th day of July 1925.

GEORGE T. SCHESVOLD.
ARTHUR M. JOHNSON.